No. 877,220. PATENTED JAN. 21, 1908.
G. F. NILSSON.
AVERRUNCATOR.
APPLICATION FILED SEPT. 6, 1907.
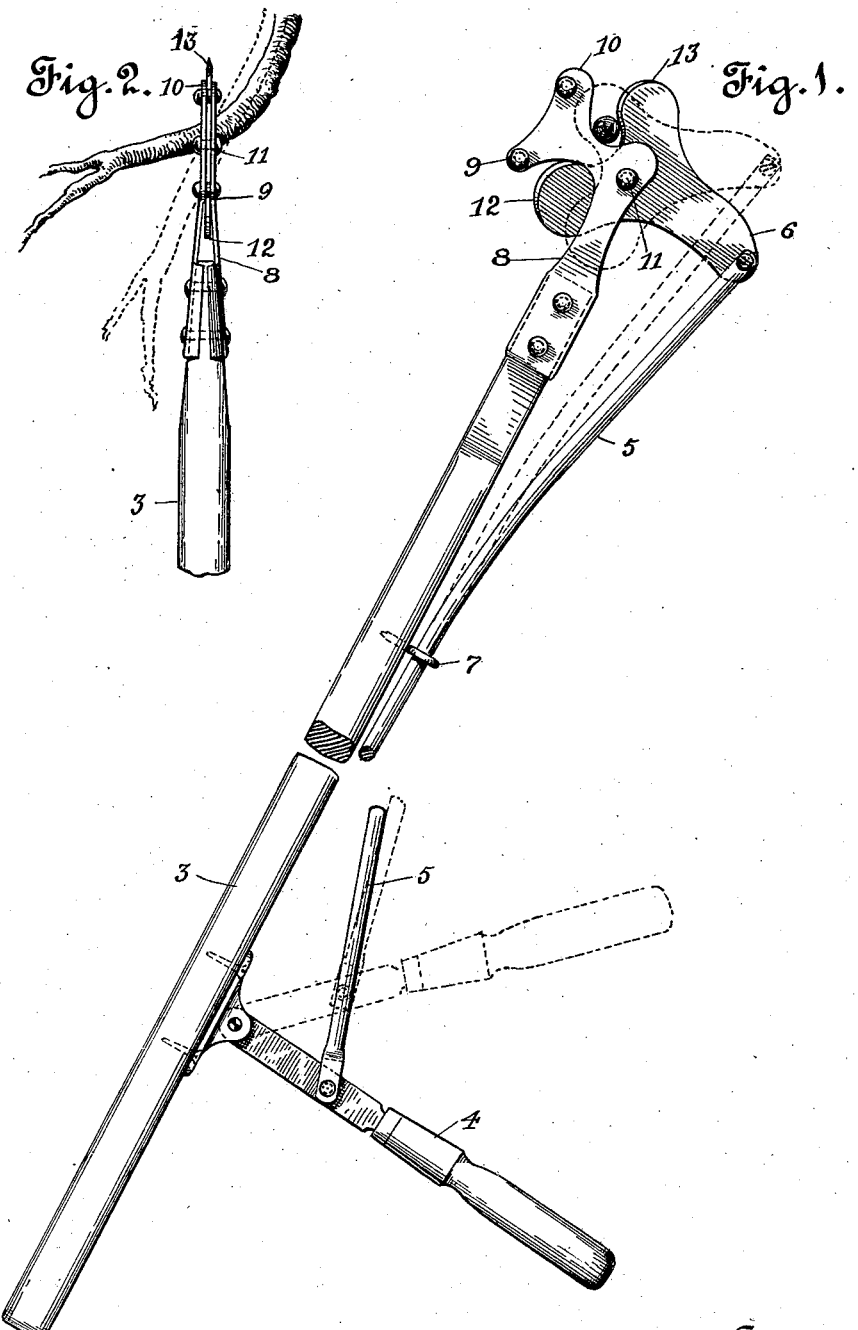
Witnesses.
Inventor,
George F. Nilsson,
By ........ Attorney.

UNITED STATES PATENT OFFICE.

GEORGE F. NILSSON, OF PASADENA, CALIFORNIA.

AVERRUNCATOR.

No. 877,220.　　　Specification of Letters Patent.　　　Patented Jan. 21, 1908.

Application filed September 6, 1907. Serial No. 391,665.

*To all whom it may concern:*

Be it known that I, GEORGE F. NILSSON, a citizen of the United States, residing at Pasadena, county of Los Angeles, State of California, have invented new and useful Improvements in Averruncators, of which the following is a specification.

My invention relates to a pruning instrument, the cutter of which is mounted on the end of the pole and is operated by means of a lever mounted on the other end of a pole and connected to the cutter by a rod; and the object thereof is to provide a pruning instrument by means of which the ends of downwardly projecting branches of a tree at considerable elevation may be cut off as well as upwardly projecting branches. I accomplish this object by the tool herein described and illustrated in the accompanying drawings in which:

Figure 1 is a side elevation of my improved tool in position for cutting a downwardly projecting branch, which is shown in section therein. Fig. 2 is an edge elevation of the upper portion of my improved tool, with a portion of the branch shown.

In the drawings 3 is the handle or pole to which is pivotally secured near the lower end thereof the operating lever 4. To this lever intermediate its ends is secured a somewhat stiff but flexible operating rod 5, the other end of which is secured to the shank 6 of the pruning knife. This rod preferably passes through a guiding eye 7 which is fastened in the handle or pole. To the upper end of the pole is secured the double hook 8 which is preferably formed of two plates and is provided with a downwardly projecting nib 9 forming a lower hook and an upwardly projecting nib 10 forming an upper hook. Between these two plates the knife is pivotally mounted by bolt 11. The knife is provided with a downwardly projecting blade or lower cutter 12 and an upwardly projecting blade or upper cutter 13. These cutters are adapted to be thrown by the lever alternately between the members forming the upper and lower hooks and are sharpened at the points where they enter these hooks. As best shown in Fig. 1 the pruning knife or cutter resembles somewhat a three pointed star with two of the points rounded off and shorter than the third which forms the shank of the cutter, the other points being sharpened into cutting edges where they enter the hooks.

By this construction it will be seen that my tool can be used in the ordinary manner to prune such limbs as the lower hook can be thrown over, and that when a limb projects downwardly to such an extent that the lower hook cannot be used to advantage that the knife can be thrown to the open position as shown in Fig. 1 and the limb then can be caught from beneath with the upper hook and cut off with the upper blade of the knife by moving the operating lever upwardly, which causes the knife to close as shown in dotted lines in Fig. 1, thereby cutting off the limb. In this construction it is necessary that an operating rod shall be used which is stiff enough to operate the knife when it is desired to cut off a limb in the upper hook.

It will be observed that both hooks are at one side and at the top of the handle, and that the pruning knife works alternately in the hooks, so that there is no danger when operating with one cutting edge and hook that another limb may accidentally get in the other hook and be cut off by the other cutting edge. Another advantage is that when cutting a limb in the upper hook, it requires an upward thrust of the lever which operates the cutter and that both hands are moving in the same direction so that there is no danger of pulling down on a limb and thereby causing it to split off, while cutting off the end of the limb.

Having described my invention what I claim is:

1. An averruncator comprising a handle; a double hook secured to the top and at one side of the upper end thereof, one of the hooks opening upwardly and the other opening downwardly; a knife having two blades and a shank pivotally secured to said hook, one of said blades being adapted to cut a limb in the upper hook and the other blade to cut a limb in the lower hook; a lever pivotally secured to the handle near its lower end; and a rod connecting said lever and knife.

2. An averruncator comprising a handle; a double hook composed of two separated plates secured to said handle near the top thereof, said hooks being at one side of said handle, and one of them opening upwardly and the other downwardly; a knife having an upper and a lower blade and a shank pivotally secured between the plates of said hooks, one of said blades being adapted to cut a limb in the upper hook, and the other in the lower hook; a lever pivotally secured in said handle near the lower end thereof; and a rod connecting said lever and the shank of said knife.

In witness that I claim the foregoing I have hereunto subscribed my name this 30th day of August, 1907.

GEORGE F. NILSSON.

Witnesses:
G. E. HARPHAM,
S. B. AUSTIN.